April 5, 1949.  C. B. McKNIGHT  2,466,254
CELLULAR ELASTIC VEHICLE TIRE
Filed Nov. 19, 1946  2 Sheets-Sheet 1
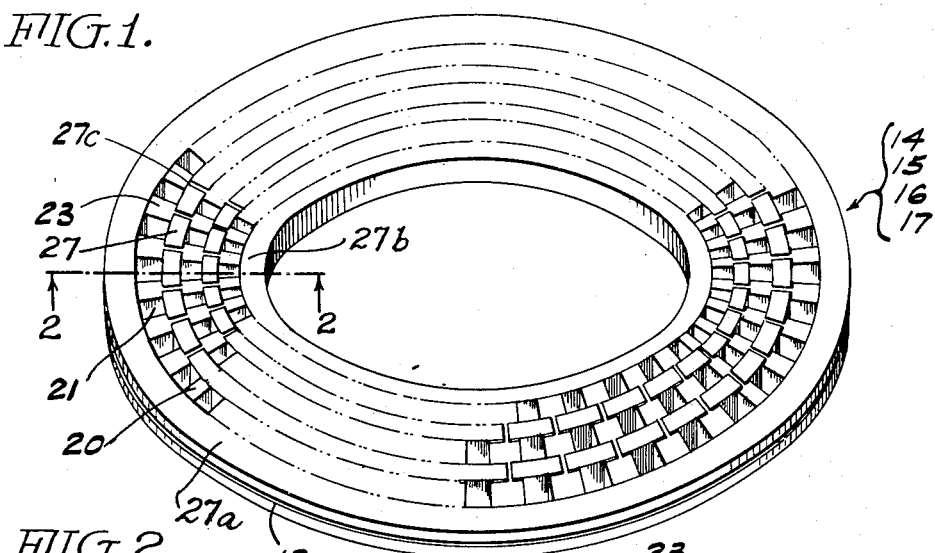
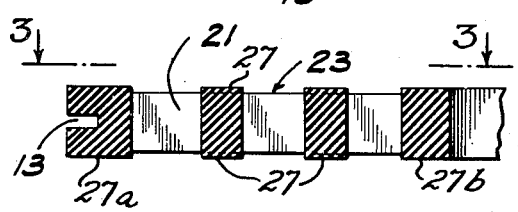
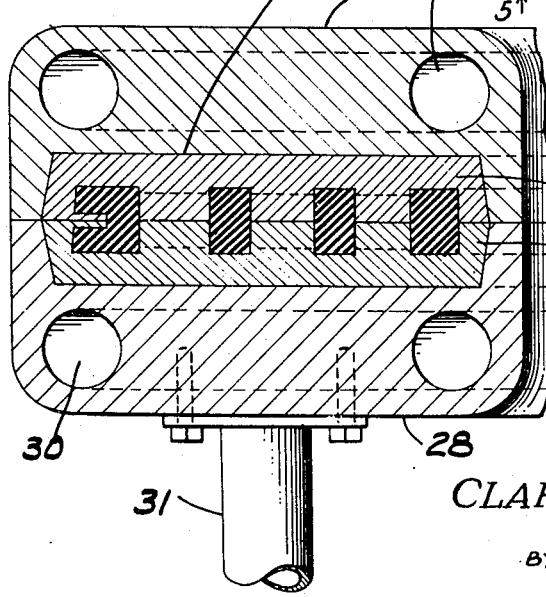
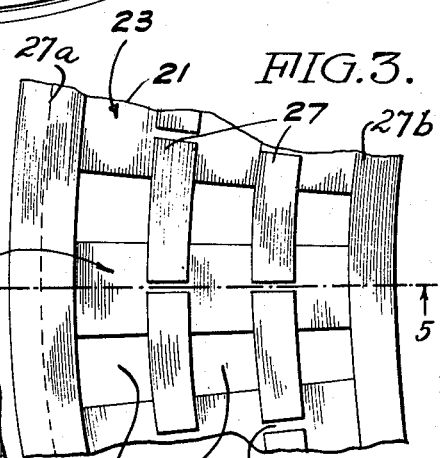
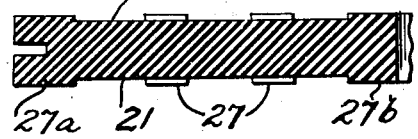
CLARENCE B. McKNIGHT,
INVENTOR
BY
ATTORNEY April 5, 1949.  C. B. McKNIGHT  2,466,254
CELLULAR ELASTIC VEHICLE TIRE
Filed Nov. 19, 1946  2 Sheets-Sheet 2

CLARENCE B. McKNIGHT,
INVENTOR

Patented Apr. 5, 1949

2,466,254

UNITED STATES PATENT OFFICE 2,466,254

CELLULAR ELASTIC VEHICLE TIRE

Clarence B. McKnight, Van Nuys, Calif.

Application November 19, 1946, Serial No. 710,823

13 Claims. (Cl. 152—328)

1

This invention relates to improvements in a cellular, elastic vehicle tire.

This invention further relates to a laminated, cellular tire structure having the layers of laminae arranged in a novel manner, namely in planes extending at a right angle to the axis of the wheel. This is a new feature in the art to which the invention pertains and makes it possible to manufacture the tire in a more rapid and less expensive manner.

An object of the invention is to provide a vehicle tire having an improved arrangement of internal cells or air spaces formed in the elastic material thereof.

Still another object of the invention is to provide improved air passage means for maintaining pneumatic intercommunication between a multiplicity of air cells within the tire.

Yet another object of the invention is to provide a tire body of elastic material having distributed throughout its interior portion a multiplicity of communicating air cells, in combination with an exterior surrounding portion having bleed openings in a communication with the cellular interior structure of the tire, said bleed openings being sufficiently small and limited in number to obstruct the outflow of the air to such an extent in the operation of the tire as to impart to the tire a pneumatic quality, thus preserving to a great extent the quality of a pneumatic resiliency without the disadvantage of the tire being put out of service if punctured.

A more specific object is to provide a tire made up of layers lying in planes extending at a right angle to the axis of the tire, said layers being vulcanized to each other in a face-to-face manner, each internal layer of the tire having through it a multiplicity of openings which are staggered in relation to those of the adjacent layers, thus producing a cellular tire structure which can be more advantageously manufactured and consequently placed on the market at a lower price than competing tires of the same class.

Another and more specific object is to provide an elastic semipneumatic, cellular tire wherein an arrangement of restricted airbleed openings through the otherwise imperforate exterior portion of the tire produces a superior operation of the tire by reason of permitting a partial escape of the air from the compressed lower portion of the air within the tire as the vehicle advances, the air being restored through said bleed openings to each compressed part of the tire as such part rises from the roadway and expands to its normal contour, thus subjecting the tire to an inflow and outflow of air that has a cooling effect upon it and gives it a better wearing quality.

Other objects, advantages and features of invention will hereinafter appear.

Referring to the accompanying drawings, which illustrate a preferred embodiment of the invention, Fig. 1 is a perspective view of one of the interior layers of the tire looking downwardly toward a side thereof.

Fig. 2 is a cross section of the layer shown in Fig. 1, the plane of section being indicated by line 2—2 on Fig. 1.

Fig. 3 is a fragmentary plan view of a portion of one of the interior layers of the tire as viewed from the line 3—3 of Fig. 2.

Fig. 4 is a view illustrating the operation of molding one of the typical interior layers of the tire. This view is a cross-section taken through one side of the single-layer forming mold, at the plane indicated by line 2—2 on Fig. 1, showing said layer in the mold.

Fig. 5 is a cross section on line 5—5 of Fig. 3.

Figure 6:
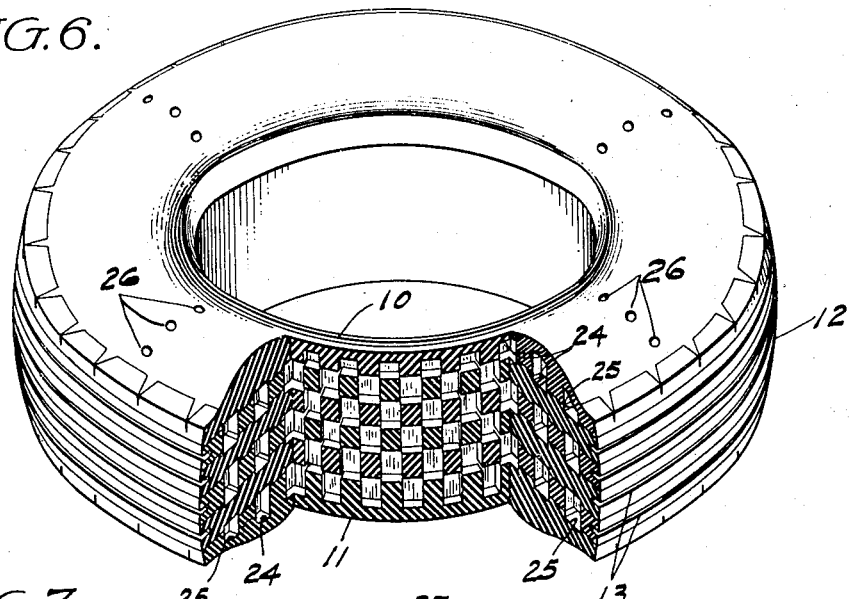
Fig. 6 is a perspective view of the tire looking down upon the same while lying in a horizontal position, the portion of the tire nearest to the observer having a deep segment cut out of it so as to disclose the tire's internal structure.
Figure 7:
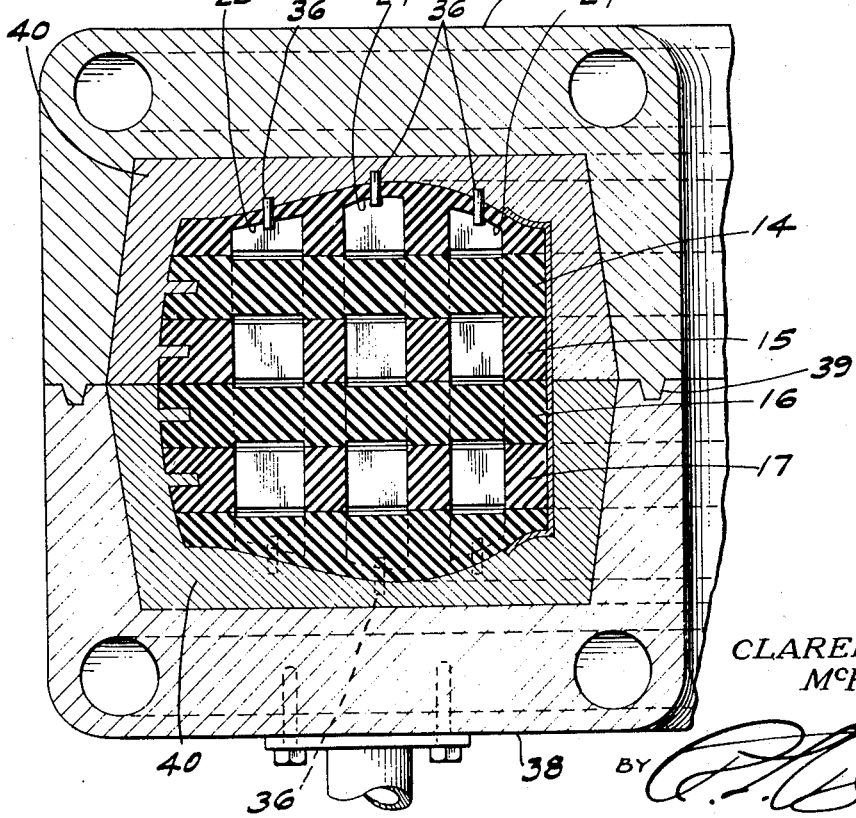
Fig. 7 is a cross section through the tire forming mold showing the composite sections forming a tire being vulcanized together.

Referring in detail to the drawings, the tire is composed of rubber or other elastic material and as viewed, for example, in Fig. 6 has twin outer side walls or layers 10 and 11 which are outcurved as they approach the center of the tire so as to narrow somewhat, relatively, the tread portion 12 of the tire, said tread portion having a plurality of circumferential grooves 13, each of these grooves being molded into the periphery of an individual internal tire layer, four of which are shown in Fig. 7 where they are, from above downwardly, numbered 14, 15, 16 and 17.

Each of said internal tire layers or laminae lies in a plane which extends at a right angle to the axis of the wheel, and each layer has through it a multiplicity of square apertures 20 arranged in a checker-board fashion. These layers are vulcanized to each other in a face-to-face formation, in which formation the holes and stock of contacting layers are circumferentially staggered, as well shown in Figs. 6 and 7.

Circumferentially extending rows of square intact tire portions 21 are formed, the intact portions of each of said rows alternating with the aforesaid apertures 20. Said intact portions 21 are somewhat wider than the intervening apertures, and when the tire layers are superimposed upon each other adjacent layers are so positioned circumferentially in relation to each other that said apertures of each layer are staggered in relation to the intact portions of the layer or layers against which such layer abuts. Also said intact portions overlap at each end of the apertures with which they register.

Also, a part of the arrangement for affording entrance to and outflow of air from all portions of the cellular structure of the tire, there are provided circumferentially extending and also radially extending rows of depressions 23 upon each face of each layer of the tire, said depressions being opposite to each other transversely of the complete tire, and occupying areas between adjacent apertures of said rows of apertures. Owing to the depressions being opposite to each other the space between opposed depressions is twice as wide as the depth of each depression.

The side wall layers 10 and 11 are shown as twin structures. When the observer is looking at its inner face each of these layers will have the appearance of the structure shown in Fig. 1 except that, instead of the multiplicity of small openings shown in this view, arranged in checkerboard formation, he will see pits or depressions with closed bottoms. In the assembled tire these pit bottoms 24, 25, (see Fig. 6) are disposed opposite to the apertures 20 of the next layer of the tire. Owing to the convex shape of the outer surfaces of the tire layers 10 and pits of their radially outermost circumferential row of pits 25 have a less depth than the remaining pits of the tire layers under consideration, these pits progressively deepening toward the tire's center.

Each of the aforesaid side walls of the tire is provided with a plurality of air bleed holes 26, twelve of these being shown in Fig. 6 arranged in transverse rows of three holes each, these rows being equally spaced apart around the tire, but it is obvious a greater or less number of differently arranged holes may be provided without departing from the spirit of the claimed invention. Said bleed holes lead through the bottoms of the depressions 24 and 25.

There are provided circumferentially extending radially spaced apart rows of strips 27 which connect the rows of intact tire portions 21. The outer faces of said intact portions 27 are on the same level as the outer faces 27a of the rim of the tire, and are also on the same level as the outer faces 27b of the tire adjacent to its inner periphery. Thus in each interior layer each radially extending row of apertures are separated by intact portions which are thicker between radially adjacent apertures than is the material between circumferentially adjacent apertures.

Radially extending grooves 27c are cut into said strips to the same depth as said depressions 23 to provide passages whereby when the tire layers are vulcanized to each other in a face to face formation, in which formation the holes and stock of the contacting layers are circumferentially staggered, all the multiplicity of square apertures are placed into communication with each other.

Thus it will be seen when the tire is rolling upon the pavement and compressed slightly due to the load imposed thereon, air will be progressively moved circumferentially along the rows of apertures continually during the travel of the vehicle, giving to the occupants of the vehicle the sensation of riding on air. Also this means of circulation widthwise and circumferentially of the tire gives a greater cooling effect and at the same time adds to the resiliency of the tire when abnormally compressed due to an obstacle encountered in the roadbed. The cooling effect reduces heat and hence adds to the longevity of the tire.

Fig. 4 shows, in section, a mold for molding the individual interior tire layers. In this mold an annular flask 28 cooperates with an annular cope 29, suitable steam-conducting passages 30 being shown which supply, from a pipe 31, a vulcanizing heat to the mold. Between these cooperating mold sections is formed a chamber 32 into which are fitted an upper die block 33 and lower die block 34.

A suitable mold structure, not shown, is used for molding the twin outside tire layers 10 and 11 and at the same time vulcanizing into the tire the pins 36 shown in Fig. 7. However the construction of a mold for making said outer layers 10 and 11 will be readily understood to those skilled in the art, aided by the description already given of the mold structure of Fig. 4. In the latter view upper and lower mold frame members 37 and 38 are shown having an interfitting joint 39, said members holding in place twin die blocks 40. After the final molding and vulcanizing together of all the tire layers has been performed the pins 36 will be removed leaving the aforementioned bleed openings 26.

I claim:

1. A tire of the class described comprising a series of superimposed vulcanized together layers which extend circumferentially thereof and lie in planes extending right-angularly to its axis, each of said layers having as viewed from its lateral faces a checkerboard like arrangement of apertures through it, the intact circumferentially extending portions between the apertures of each layer being wider than the intervening apertures so that when said layers are superimposed upon each other and circumferentially staggered in relation to each other with apertures registering with intact portions said intact portions will not only overlie the apertures but will bridge the same in an overlapping manner.

2. A cellular tire comprising a plurality of layers that abut each other laterally along planes that extend at right angles to the tire's axis, each layer having a plurality of radially spaced circumferentially arranged series of apertures extending therethrough, the apertures of each layer being staggered circumferentially in relation to adjacent layers, and there being depressions in the partially abutting faces of each layer between its apertures placing the entire set of apertures in each circumferential series in communication with each other.

3. The subject matter of claim 2, and there being passages between radially adjacent depressions placing each radially adjacent series of said apertures in communication with each other.

4. A tire of the class described comprising a series of superimposed vulcanized together layers which extend circumferentially thereof and lie in planes extending right-angularly to its axis, each of said layers having as viewed from its lateral faces a checker-board like arrangement of apertures through it, the adjacent layers of the tire being staggered in relation to each other in regard to said apertures so that intact portions register with apertured portions of contacting layers.

5. A tire of the class described comprising a series of superimposed vulcanized together layers which extend circumferentially thereof and lie in planes extending right-angularly to its axis, each of said layers having as viewed from its lateral faces a checker-board like arrangement of apertures through it, and outside layers each of which forms a side wall of the tire vulcanized to each outer layer of said series of layers, said outside layers being provided with a checker-board arrangement of recesses in their inner faces, all of said layers being constructed and arranged in such a manner that all of said apertures and recesses inter-communicate.

6. In a vehicle tire, superimposed layers that abut each other laterally along planes that extend at a right angle to the tire's axis, each layer having a plurality of rows of radially and circumferentially spaced apertures extending transversely therethrough, there being a plurality of rows of radially spaced, circumferentially extending depressions in the outer faces of said layers placing the apertures of each circumferential row in communication with each other, there being radially extending passages in the faces of the intact portions between rows of the aforesaid rows of apertures placing radially adjacent rows of apertures in communication with each other.

7. The subject matter of claim 6, and said passages consisting of surface grooves in said tire layers.

8. A tire of the class described comprising a series of superimposed vulcanized together layers which extend circumferentially thereof and lie in planes extending right-angularly to its axis, each of said layers except the ones at the outside of the tire having, as viewed from its sides, a checker-board like arrangement of apertures through it, the adjacent interior layers of the tire being staggered in relation to each other in regard to said apertures so that intact portions register with apertured portions of contacting layers, abutting layers of the tire having depressions in their said intact portions which are equal in depth and are opposite to each other thus making circumferentially extending passages double the thickness of the depressions which form them.

9. A tire of the class described comprising a series of superimposed vulcanized together layers which extend circumferentially thereof and lie in planes extending right-angularly to its axis, each of said layers having as viewed from its lateral faces a checker-board like arrangement of apertures through it, and outside layers each of which forms a side wall of the tire vulcanized to each outer layer of said series of layers, said outer layers each having a transversely convex outer face, there being a multiplicity of recesses in checker-board formation in the inner face of each of said outer layers and such layer being positioned with its said recesses circumferentially staggered in relation to the adjacent tire layer so that the recesses of each outer layer come opposite to the intact portions of the adjacent layer, the recesses of the transverse rows of each outer layer varying in depth so as to maintain a substantially equal thickness of the outer wall portion of each of said outer layers.

10. A tire of the class described comprising a series of superimposed vulcanized together layers which extend circumferentially thereof and lie in planes extending right-angularly to its axis, each of said layers having as viewed from its lateral faces a checker-board like arrangement of apertures through it, the intact circumferentially extending portions between the apertures of each layer being wider than the intervening apertures so that when said layers are superimposed upon each other and circumferentially staggered in relation to each other with apertures registering with intact portions said intact portions will not only overlie the apertures but will bridge the same in an overlapping manner, in each interior layer each radially extending row of apertures being separated by intact portions which are thicker between radially adjacent apertures than is the material between circumferentially adjacent apertures.

11. The subject matter of claim 10, and said thicker parts being symmetrically positioned in relation to the thickness of each layer.

12. The subject matter of claim 10, and said thickened portions having end portions circumferentially adjacent to each other affording radial passages between them.

13. The subject matter of claim 10 and, said thickened portions having radially extending grooves cut into their surfaces placing all of said apertures in the tire in communication with each other.

CLARENCE B. McKNIGHT.

REFERENCES CITED

The following references are of record in the file of this patent:

UNITED STATES PATENTS

| Number | Name | Date |
|---|---|---|
| 906,569 | Seiberling | Dec. 15, 1908 |
| 1,306,587 | Ferguson | June 10, 1919 |
| 1,403,289 | Cartier | Jan. 10, 1922 |

FOREIGN PATENTS

| Number | Country | Date |
|---|---|---|
| 368,562 | Great Britain | Mar. 19, 1932 |
| 630,562 | Germany | Mar. 7, 1936 |